April 25, 1939.  G. S. HENDRIE  2,155,488
RUBBER STEERING WHEEL
Filed June 14, 1937
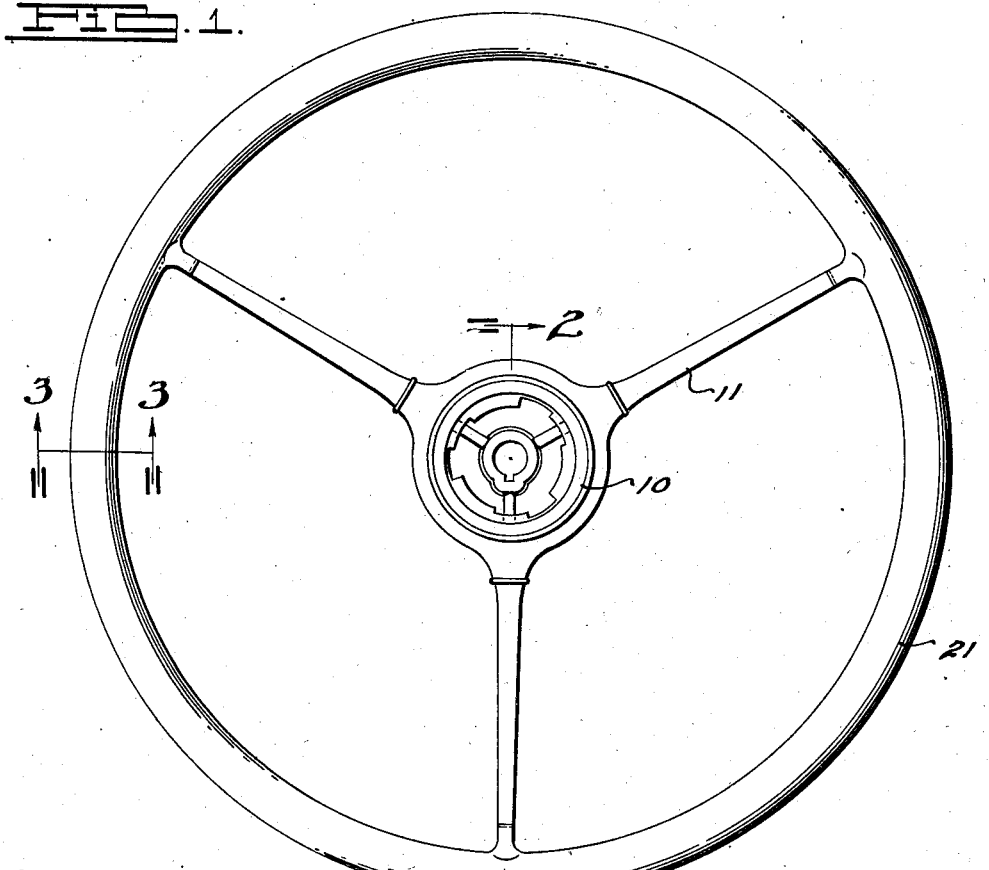
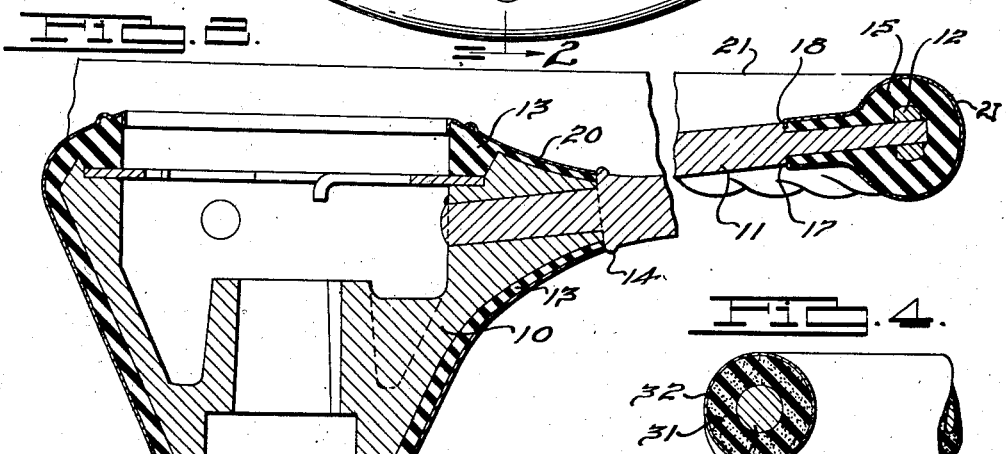
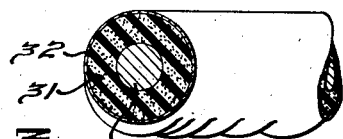
INVENTOR
George S. Hendrie.
BY
ATTORNEYS.

Patented Apr. 25, 1939

2,155,488

UNITED STATES PATENT OFFICE 2,155,488

RUBBER STEERING WHEEL

George S. Hendrie, Grosse Pointe Farms, Mich., assignor to Detroit Macoid Corporation, Detroit, Mich., a corporation of Michigan Application June 14, 1937, Serial No. 148,033

5 Claims. (Cl. 74—552)

This invention relates to improvements in steering wheel devices particularly intended for use in motor vehicle constructions.

Prior to the present invention it has been suggested that resilient or flexible materials were desirable for covering of the skeleton or framework forming a steering wheel adapted for use in motor vehicle construction. Attempts to utilize such flexible materials were not wholly satisfactory because of the difficulty in securing a satisfactory finish on such articles. A satisfactory finish of such articles must be flexible to permit flexing of the resilient materials used in forming the wheel, and at the same time such finishes must be wear-resistant and impervious to moisture, oil, grease, and the like. Also the surface must not be materially affected after long periods of use and must not wear off or become rough or pitted in use.

It is a primary object of the present invention to provide a resilient or flexible steering wheel which has a rigid skeleton or framework covered with flexible material, such for example as flexible rubber, and which is provided with a coating substantially impervious to moisture, oil, or grease.

It is a further object of the present invention to provide a steering wheel having a substantially rigid skeleton or framework covered with a body portion of a molded compressible resilient material, such for example as sponge rubber, which is protected by a surface of a flexible coating material which is substantially impervious to moisture, grease, oil, and the like.

It is a further object of the present invention to provide a steering wheel construction particularly adapted for use in motor vehicles, which comprises a wheel formed of a rigid skeleton covered with a molded body preferably formed of flexible or resilient rubber and which is provided with a flexible, ornamental coating which is smooth in texture and which is substantially unimpaired by prolonged use.

Other objects and advantages of this invention will appear in the following description and appended claims, reference being had to the accompanying drawing forming a part of this specification, wherein like reference characters designate corresponding parts in the several views.

Fig. 1 is a plan view showing one embodiment of a steering wheel embodying the present invention;

Fig. 2 is a sectional view taken substantially on the line 2—2 of Fig. 1;

Fig. 3 is a sectional view taken substantially on the line 3—3 of Fig. 1;

Fig. 4 is a view similar to Fig. 3 showing a modification of the invention.

Before explaining in detail the present invention, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation, and it is not intended to limit the invention claimed herein beyond the requirements of the prior art.

In carrying out the present invention, I propose to employ a rigid skeleton or framework comprising a hub portion 10, spoke portions 11, and a rim portion 12 (Fig. 2). As shown in the sectional view in Fig. 2, the spokes 11 are secured to the hub 10 and the rim 12 in any suitable manner, as for example by welding. A flexible body covering is preferably formed of rubber or similar material as indicated at 13 and is placed over the hub portion. The details of construction of the hub portion may be modified to meet any particular type of connection between the hub of the steering wheel and the steering column (not shown).

In order to provide a stop for the rubber coating placed on the hub 10, a continuous rim or annular rib 14 is preferably provided on the end of each spoke 11 at a point adjoining the hub 10. The rubber 13 terminates against the face of the shoulder formed by the flange 14 at a point adjacent the connection between the spokes 11 and the hub 10. The body portion 15 forming the rim is preferably formed of suitable molded material, such for example as flexible or resilient rubber. The rubber portion 15 is molded to any desired configuration, one form of which is shown in Fig. 3, wherein the underside is corrugated as at 16 to permit a more positive gripping of the wheel by the fingers of the user.

As shown in Fig. 2, a shoulder 17 is preferably formed on each spoke 11 at a point adjacent the end of the rubber body portion 15. The end of the rubber portion 15 is spaced as at 18 from the shoulder 17 so as to provide a narrow continuous groove or annular channel into which the finish coating may be flowed and definitely stopped, thereby providing a means for anchoring the terminal edge of the finish coating.

The coating composition 20 is placed on the rubber surrounding the hub 10 and abuts against the shoulder formed by the rib or rim 14 provided on the inner end of each spoke 11, this shoulder thus forming a protecting shield for the raw edge of the coating. The coating 21 provided on the body of the rim of the wheel extends over the rubber body portion 15 and projects inwardly into the grooves at 18 provided between the ends of the rubber body portion 15 and the shoulder 17 on the spokes, as clearly shown in Fig. 2. Thus the coating 21 completely encases the rim 15 of the wheel and also the outer terminal portions of the spokes adjacent their junctures with the rim, and this casing is locked in the annular grooves 18 by flange-like portions, as shown, which are wholly concealed. This is a very desirable feature since it permits the finishing off of the coating in such a manner as to eliminate the possibility of impairing the adhesion of the coating by cracks in the coating which otherwise might start at the raw terminal edges of the coating.

In the embodiment of the invention here shown, it is intended that the coating should cover merely the rubber portions of the wheel. The spoke portions 11 generally are finished in some preferred ornamental manner, as for example by providing a metallic coating of nickel, chrome, or the like. However, if desired, the finish coating may extend over the spoke portions. Also the spoke portions may be formed as here shown for the formation of the rim and the hub portions, that is, the spokes may be formed of rigid materials, for example a steel frame or skeleton, over which is placed a body portion of rubber or other flexible material.

If desired, the steering wheel may also be constructed as shown in the modification of Fig. 4. This construction comprises a rigid frame or core 30, on which is placed a molded body portion 31, preferably formed of sponge rubber or the like. On this portion 31, a flexible and ornamental coating 32 is placed, as will be hereinafter more fully described. The coating which it is proposed to use in connection with the proposed construction herein set forth, is sufficiently flexible so as to provide for the ready yielding or flexing of the sponge rubber member.

The coating composition which I propose to use in connection with the present invention is a coating composition which is of the air drying type and provides for a coating of varying but controlled thicknesses of approximately .005 inch to .032 inch. The coating when applied is of a fluid character but when dried has an appearance and density substantially the same as the appearance and density of a thermoplastic body. The coating may be applied to the steering wheel of the present invention by dipping, spraying, or brushing the composition onto the surface of the wheel. The composition dries under normal atmospheric temperatures and pressures and forms a substantially imperforate coating having in all instances thicknesses in excess of approximately .005 inch. It also possesses relatively high film and tensile strength and is of sufficient toughness to be very resistant to abrasion and therefore useful under the conditions of extreme usage and wear to which such compositions are subjected when used with a steering wheel of the present invention. The film also possesses a high degree of elasticity so that the rubber portion of the steering wheel may be deformed under pressure without causing a breakage of the film of the coating composition.

Attempts which have been made to use thermoplastic coating compositions on steering wheels of the type of the present invention have not been wholly satisfactory because of the high temperatures required for putting such coatings onto the body portion of the steering wheel. As here shown, the body portion is formed of rubber which, as is known, deteriorates rapidly under the conditions of heat previously used to cure or fuse a coating on such devices.

Also, the use of rigid types of coating compositions which form a rigid shell around the body portion of rubber, are not wholly satisfactory because they offset to a very large extent the desirable features resulting from the use of a rubber body portion on the steering wheel.

The coating composition which I propose to use provides a film which coalesces at substantially normal atmospheric temperatures and pressures, as for example through a temperature range of approximately 65° to approximately 100° F. The composition contains no harmful solvent or other materials which tend to cause deterioration or impairment of the rubber body portions of the steering wheel.

As one example of a coating composition for use in fabricating a steering wheel of the present invention, I have found that the following composition is satisfactory: Approximately 21% by weight of fifteen to twenty second nitrocellulose; approximately 6% by weight of dibutyl phthalate, approximately 64% by weight of butyl acetate; and approximately 9% by weight of ethyl alcohol. Such a coating composition, when placed upon the rubber portions of the steering wheel, will dry under normal conditions of temperature and pressure and conform to the contour of the article. It also will flow into the portion provided between the shoulder 17 and the end of the rubber portion 15 so as to provide a finished edge on the rim portion of the wheel. Such a coating composition has a tensile strength of approximately 8000 lbs. per square inch and is a substantially clear nitrocellulose film. The thickness will range from approximately .007 inch to .020 inch. For purposes of the present invention, the thicker films are preferred. Also, the foregoing composition may be pigmented as desired so as to give any desired type of ornamental appearance to the steering wheel.

The foregoing example of a composition satisfactory for providing the coating on the steering wheel of the present invention is of a type of material which is preferably applied by dipping of the article. Such a composition would be particularly useful if the spokes 11 were also to be covered. If, however, merely the rim and the hub portions of the wheel are to be coated, as shown in Figs. 1 and 2 hereof, a spray type of coating composition is preferable. Such a coating composition may consist of the following materials, approximate portions by weight being given in each instance:

| | Per cent |
|---|---|
| One-half second nitrocellulose | 15.2 |
| Ethyl alcohol | 6.5 |
| Dibutyl phthalate | 3.7 |
| Butyl acetate | 57.0 |
| Butanol | 15.24 |
| Butyl lactate | 2.36 |

Such a coating composition may be sprayed on the hub portion and on the rim portion without covering the spokes 11. It is desirable, however, in using either of the foregoing coating compositions, to mask the spokes 11 in some desired manner in order to prevent impairment of the ornamental surfaces thereof by the spattering of the coating composition thereon.

The foregoing types of coating compositions are particularly suitable for use in the steering wheel of the present invention, where the rubber portions provided are not of the very flexible or compressible type, such for example as ordinary molded rubber. If, however, the rubber portions of the steering wheel are of the more flexible or compressible type, such for example as that shown in Fig. 4 where sponge rubber is used to provide the body portion of the steering wheel, it is desirable to provide a somewhat more flexible type of coating composition than those previously mentioned. For dipping a very flexible rubber part, the coating composition may comprise the following approximate proportions by weight being given in each instance:

|  | Per cent |
| --- | --- |
| Fifteen to twenty second nitrated cotton | 15.7 |
| Alkyd type resin | 25.2 |
| Xylol | 9.8 |
| Toluol | 17.7 |
| Butyl acetate | 25.8 |
| Butyl alcohol | 5.9 |

This composition will be found to produce a comparatively heavy coating of approximately .020 inch in one dipping of the article. The film is sufficiently elastic so that it may be used with very soft rubber, such as sponge rubber. Repeated tests have shown that the elasticity of such a coating composition is not substantially impaired with aging of the product.

If it is desired to spray the coating composition on the more flexible types of rubber, such for example as the sponge rubber previously mentioned, a coating composition may be formed from the following ingredients, approximate proportions by weight being given in each instance.

|  | Per cent |
| --- | --- |
| One-half second nitrocellulose | 7.0 |
| Alkyd type resin | 10.0 |
| Ethyl alcohol | 19.7 |
| Butyl acetate | 20.02 |
| Ethyl acetate | 16.65 |
| Toluol | 23.3 |
| Butanol | 3.33 |

When any of the foregoing coating compositions have been placed upon the steering wheel of the present invention, it will be found that regardless of whether the materials have been sprayed, brushed, or dipped, that when the film is allowed to dry at normal atmospheric temperatures and pressures, that it is a fixed substantially imperforate film having tensile strengths and other characteristics of a plastic substance, such for example as Celluloid.

While the foregoing coating compositions may be used satisfactorily with the present invention, it is to be understood that other coating compositions having satisfactory conditions as to imperviousness to moisture, oil, grease, or the like, and having a substantial thickness and the desired degree of flexibility, may be used. Also it is to be understood that the foregoing or other coating compositions which may be used with the present invention, may be pigmented or otherwise colored in any desired manner to achieve a desired ornamental effect. I do not desire, therefore, to be limited to the use of any particular type of coating composition in carrying out the present invention beyond the scope of the appended claims.

I claim:

1. A steering wheel comprising a hub, a rim, radial spokes joining the rim and hub, said rim comprising a core having a covering of yieldable or resilient material, and a flexible cellulosic coating encasing said covering material and having edge portions thereof anchored in grooves at the localities of the spokes.

2. A steering wheel comprising a steering rim having a rigid core, a rigid hub secured to said core through a plurality of radial spokes having shoulder portions adjacent the ends thereof, a covering of sponge rubber molded on said core to form a flexible steering rim, said flexible steering rim extending to points adjacent to but spaced from said shoulders on said spokes, a coating composition encasing said rubber portion and anchored at points of contact in the spaces provided between said rim and said spokes.

3. A steering wheel comprising a rigid framework having a body of flexible rubber molded thereon and covered with a flexible coating of a nitrocellulosic nature, said coating having a thickness in excess of approximately .005 inch and having terminal edge portions anchored between adjacent portions of the said framework and said body.

4. A steering wheel comprising a steering rim having a rigid core, a rigid hub secured to said core through a plurality of radial spokes having a shoulder formed adjacent each of the ends thereof, a covering of sponge rubber molded on said core and extending to points adjacent the said shoulders on said spokes to form a flexible steering rim, a flexible coating composition encasing said rubber portion and filling the grooves between the shoulders on each of the said spokes and the adjacent edges of said steering rim, said coating composition comprising an air dried plastic body composed chiefly of nitrocellulose pigment and a suitable plasticizing agent.

5. A steering wheel comprising a hub, spokes secured thereto and extending radially outwardly therefrom, a rim secured to the outer ends of the said spokes, a body portion of sponge rubber secured to the said rim, and a substantially imperforate flexible air dried coating integrally associated with the said body portion and anchored between adjacent spaced surfaces on said rim and each of said spokes, said coating having a single layer thickness in excess of .005 inch and being composed chiefly of nitrocellulose, a plasticizer therefor and a pigment to form a coating having a flexibility and strength sufficient to permit distortion of the said sponge rubber body portion without rupture of the coating.

GEORGE S. HENDRIE.